United States Patent [19]

Hutchinson

[11] Patent Number: 5,655,809

[45] Date of Patent: Aug. 12, 1997

[54] TRUCK BOX CAP

[76] Inventor: Richard Hutchinson, 31 Garvie Bay, Winnipeg, Canada, R2K 4B5

[21] Appl. No.: 697,790

[22] Filed: Aug. 30, 1996

Related U.S. Application Data

[63] Continuation-in-part of Ser. No. 424,199, Apr. 19, 1995, abandoned.

[51] Int. Cl.$^6$ .................................................. B60P 7/02
[52] U.S. Cl. .................................................. 296/100
[58] Field of Search ........................... 296/100, 10, 164, 296/175

[56] References Cited

U.S. PATENT DOCUMENTS

| | | |
|---|---|---|
| D. 250,012 | 10/1978 | Windecker et al. . |
| 2,602,693 | 7/1952 | Murphy . |
| 3,165,352 | 1/1965 | Hallock et al. . |
| 3,650,565 | 3/1972 | Anderson . |
| 4,397,497 | 8/1983 | Alonzo, Jr. et al. . |
| 4,496,184 | 1/1985 | Byrd et al. . |
| 4,784,429 | 11/1988 | Hodges . |
| 4,944,550 | 7/1990 | Drown et al. . |
| 4,984,897 | 1/1991 | Baranski . |
| 5,067,766 | 11/1991 | Lovaas . |
| 5,127,701 | 7/1992 | Miller . |

*Primary Examiner*—Gary C. Hoge
*Attorney, Agent, or Firm*—Adrian D. Battison; Murray E. Thrift

[57] ABSTRACT

The present invention provides a truck box cap for use with light duty trucks and similar vehicles having open cargo boxes. The truck box cap provides a side profile defining a horizontal upper portion, a sharply inclined second portion and a more gradually inclined third portion extending to the tail gate. The truck box cap comprises fixed side walls, a horizontal uppermost cover member at the first portion, and a plurality of telescoping cover members lying along the third portion. Slidable connection means support the telescoping cover members for sliding movement between a covered position enclosing a portion of the truck box and a retracted position underneath the uppermost cover member exposing a portion of the truck box.

20 Claims, 8 Drawing Sheets

TRUCK BOX CAP

CROSS REFERENCE TO RELATED APPLICATIONS

This application is a continuation-in-part of application Ser. No. 08/424,199 filed Apr. 19, 1995 which is now abandoned.

FIELD OF THE INVENTION

The present invention provides an improved truck box cap for use with light duty trucks and similar vehicles having open cargo boxes.

BACKGROUND

Light trucks and similar vehicles with open cargo boxes share the problem of protecting the cargo box and its contents from snow, rain, or dirt which may cause damage to items being carried or stored in the cargo box. These vehicles also share the problem of securing these items from theft since the cargo box is open to passersby thereby leaving the contents vulnerable to theft.

Attempts to remedy these problems have been made by employing truck box caps which are fixed to the truck and enclose the truck cargo box. The majority of these truck box caps are of fixed dimensions having side walls the height of the truck cab, a fully enclosed top, and a relatively small door at the rear of the cap. Although these caps protect the contents of the cargo box from weather and theft the side walls and fully enclosed top can cause the further problem of making it impossible for the cargo box to be used with items which exceed the height of the sides without removing the cap from the truck.

Alonzo, Jr. et al. in U.S. Pat. No. 4,397,497 Aug. 9, 1983 suggests an Expandable Camper Body for a truck cargo box which has longitudinally telescoping side walls the height of the truck cab, a fully enclosed top, and a relatively small door at the rear of the cap. The telescoping side walls allow the operator to move a rear portion of the cap forward thereby leaving a rear portion of the cargo box open to hold large items. This cap is complex, does not have an aesthetically pleasing side profile when in the forward position, and allows for only a minority of the cargo box to be utilized when transporting large objects.

Drown et al in U.S. Pat. No. 4,944,550 Jul. 31, 1990 suggests a Telescoping Type Cover for Truck Beds and The Like which has longitudinally telescoping side walls the height of the truck cab, and a fully enclosed top. Like Alonzo the telescoping side walls allow the operator to move a rear portion of the cap forward thereby leaving a rear portion of the cargo box open to hold large items. This cap is also complex requiring a powered actuating system to move the rear portion of the cap forward, and does not have an aesthetically pleasing side profile when in the forward position.

Baranski in U.S. Pat. No. 4,974,898, Dec. 4, 1990 suggests a Telescoping Cover for Storage Facilities which can be used with a truck cargo box which has longitudinally telescoping cover members each having low side walls which are slightly higher than the cargo box walls, and a fully enclosed top. The telescoping cover members allow the operator to move a rear portion of the cover forward thereby leaving a rear portion of the cargo box open to hold large items. This cover does not allow for the storage of items which are much higher than the cargo box side walls when the cover is closed and does not have an aesthetically pleasing side profile when in the forward position.

Lovaas in U.S. Pat. No. 5,067,766, Nov. 26, 1991 suggests a Telescoping Cover for A Pickup Truck Bed which has longitudinally telescoping cover members each having low side walls which are only as high as the cargo box walls, and a fully enclosed top. The telescoping cover members allow the operator to move a rear portion of the cover forward thereby leaving a rear portion of the cargo box open to hold large items. This cover has the same problems as Baranski in that it does not allow for the storage of items which are higher than the cargo box side walls when the cover is closed, and does not have an aesthetically pleasing side profile when in the forward position.

Miller in U.S. Pat. No. 5,127,701, Jul. 7, 1992 suggests a Shell For Bed Of Pick-Up Truck which shows a cap for a light truck which has a first portion fixed at the top of the cargo box of the truck which is a top extending rearwards from the cab of the truck and then slopes down towards the back of the truck and the second portion which extends rearwards from the first portion and is positioned above the sloping part of the first portion. The second portion is hinged at the start of the slope of the first portion and extends rearwards to the back of the truck box. The second portion can be flipped upwards allowing an object larger than the cap to be placed in the truck box beneath the second portion. This arrangement has the difficulty in that the second portion would be difficult to lift into the upright position, projects upward causing drag when the vehicle is in motion, and would tend to bounce up and down in response to bumps in the road possibly colliding with something placed beneath it.

R. J. Murphy in U.S. Pat. No. 2,602,693, Jul. 8, 1952 suggests a sliding closure. This sliding closure provides a plurality of telescoping cover members arranged and closed the open top of the box of a transport truck or van. The telescopic members extend rearwards from a container mounted on top of the cab of the truck or van and extend outwards along the length of the cargo box thereby enclosing the top. This enclosure requires that the sides of the cargo box be at the same height as the cab of the truck and therefore is not practical for use of most light duty and pick-up trucks.

A truck box cap for use with the open cargo box of a light duty truck is needed which is simple, provides an aesthetically pleasing side profile, protects the cargo box and its contents from snow, rain, or dirt that can cause damage to items being carried or stored in the cargo box, secures the items being carried or stored from theft, and permits the cargo box to be used to transport large items without having to remove the box cap.

SUMMARY

According to the present invention there is provided a truck box cap for use with a light truck cargo box comprising:

side walls fixed along spaced apart parallel boundaries of said cargo box and extending along the length thereof;

an uppermost cover member being arranged at a front end of the side walls and fixed adjacent top edges of said side walls extending therebetween thereby enclosing a first portion of said cargo box;

a plurality of telescoping cover members including a rearmost cover member and an intermediate cover member arranged rearwards of the uppermost cover member and adjacent the top edges of said side walls extending therebetween thereby enclosing a second portion of said cargo box;

and slidable connection means connecting the plurality of telescoping cover members such that the plurality of telescoping cover members are extendible into a cover position extending from said uppermost cover member to substantially enclose the second portion of said cargo box, and are retractable into a retracted position beneath said uppermost member so as to leave the second portion of said cargo box at least partially open;

wherein the slidable connection means comprise:

two uppermost track members each fixed adjacent a respective side wall at a front end thereof and lying adjacent an underside of the uppermost cover member;

two rear track members each fixed adjacent a respective side wall;

two intermediate track members each being arranged adjacent a respective side wall, and fixed to an underside of said intermediate cover member;

and means attaching the intermediate track members to respective uppermost track members arranged at respective front ends of the intermediate track members and for movement along said uppermost track members;

and wherein the intermediate cover member is attached by movable attachment means adjacent a rearward end thereof to the rear track members for movement therealong, and wherein the rearmost cover member is attached by movable attachment means adjacent a forward end thereof to the intermediate track members for movement therealong, and is attached by movable attachment means adjacent a rearward end thereof to the rear track members for movement therealong.

Preferably the means attaching the intermediate track members to respective uppermost track members comprise two hanger members each attached by movable attachment means at a top end to a respective one of the uppermost track members for movement therealong and depending downwardly therefrom, and movable attachment means mounted adjacent a forward end of each intermediate track member arranged for movement on the hanger members.

Alternatively the intermediate cover member includes a panel member arranged adjacent a forward end thereof and extending laterally across and upwardly therefrom, and wherein the means attaching the intermediate track members to respective uppermost track members comprise movable attachment means arranged on the panel member on opposite sides thereof to engage respective uppermost track members for movement therealong.

Preferably the plurality of telescoping cover members are arranged end to end in the cover position.

According to a second aspect of the invention there is provided a truck box cap for use with a light truck cargo box comprising:

side walls fixed along spaced apart parallel boundaries of said cargo box and extending along the length thereof;

a top edge of each side wall defining a first portion extending substantially horizontally from the front end to a first point spaced from the front end, a second portion which slopes steeply downwards from the first portion to a second point, and a third portion which slopes more gradually downwards from the second portion to a third point;

an uppermost cover member being arranged at the first portion of the side walls and fixed adjacent said top edges of said side walls extending therebetween thereby enclosing a first portion of said cargo box;

a plurality of telescoping cover members arranged rearwards of the uppermost cover member, adjacent the top edges of said side walls and extending between said third portions of said side walls so as to be inclined from the first portion rearwardly and downwardly therefrom thereby enclosing a second portion of said cargo box;

and slidable connection means mounting the plurality of telescoping cover members such that the plurality of telescoping cover members are extendible in a direction rearwardly and downwardly from said uppermost cover member to substantially enclose the second portion of said cargo box, and are retractable beneath said uppermost member so as to leave the second portion of said cargo box at least partially open.

According to a third aspect of the present invention there is provided a truck box cap for use with a light truck cargo box comprising:

side walls fixed along spaced apart parallel boundaries of said cargo box and extending along the length thereof;

an uppermost cover member being arranged at a front end of the side walls and fixed adjacent top edges of said side walls extending therebetween thereby enclosing a first portion of said cargo box;

a plurality of telescoping cover members including a rearmost cover member and an intermediate cover member arranged rearwards of the uppermost cover member and adjacent the top edges of said side walls extending therebetween thereby enclosing a second portion of said cargo box;

the cover members being inclined downwardly and rearwardly from the uppermost cover member;

and slidable connection means mounting the plurality of telescoping cover members for sliding movement in a direction inclined downwardly and rearwardly from the uppermost cover member such that the plurality of telescoping cover members are extendible into a covering position extending from said uppermost cover member to substantially enclose the second portion of said cargo box, and are retractable into a retracted position beneath said uppermost member so as to leave the second portion of said cargo box at least partially open;

wherein each one of the lowermost and intermediate cover members includes a substantially flat main body portion;

and wherein the slidable connection means includes guide elements for the lowermost cover member which are angled from the direction inclined rearwardly and downwardly in a substantially horizontal direction starting at a point near their respective rearward ends such that the lowermost cover member moves substantially horizontally as it is fully extended to move to a position in which a forward edge thereof lies substantially immediately underneath a rearward edge of the intermediate cover member.

In the accompanying drawings, which illustrate an exemplary embodiment of the present invention:

BRIEF DESCRIPTION OF THE DRAWINGS

FIG. 9 is an isometric view showing the roof wing and lamps.

In the drawings like characters of reference indicate corresponding parts in the different figures.

DETAILED DESCRIPTION

Figure 1:
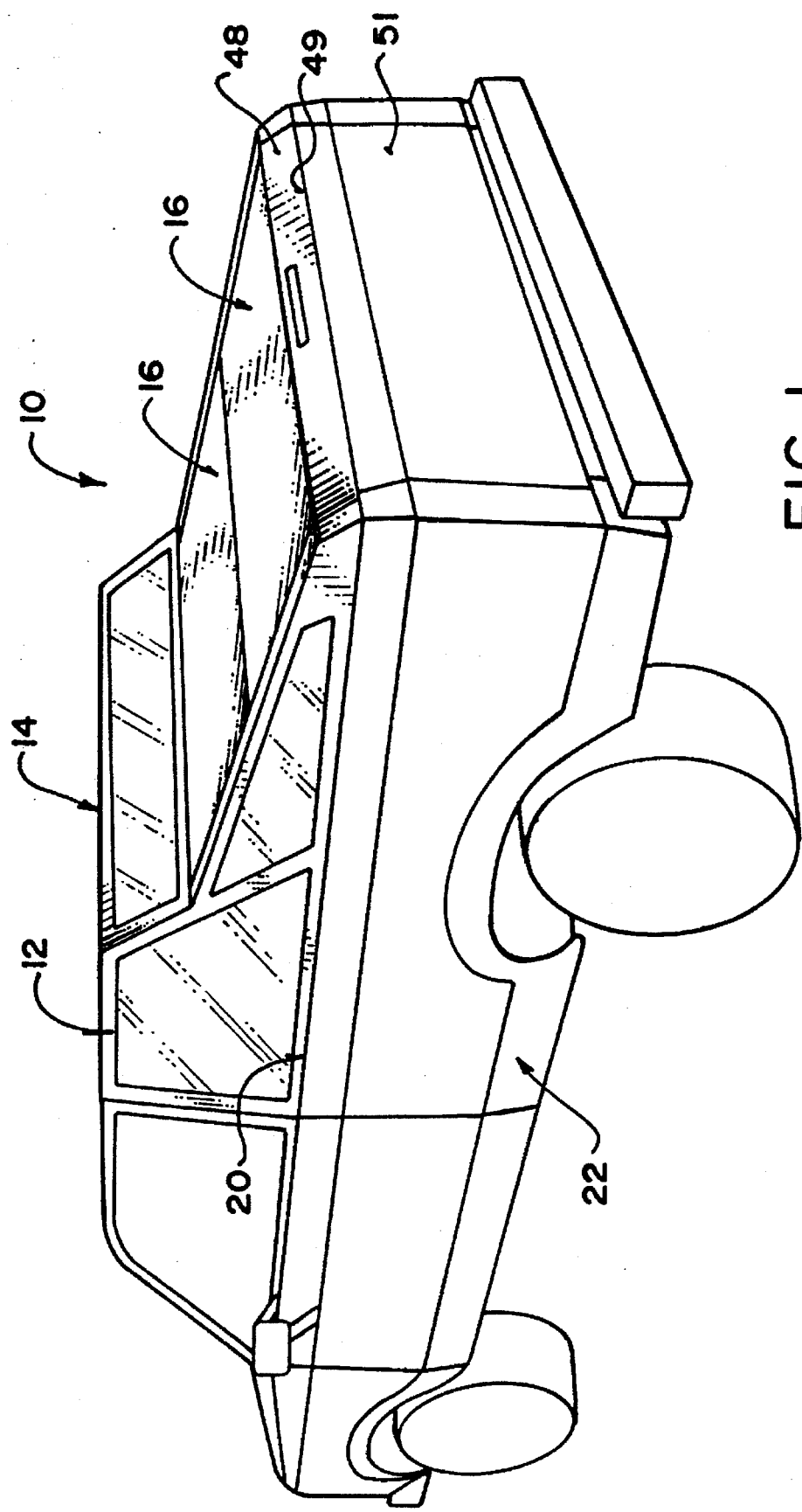
FIG. 1 is an isometric view of the truck box cap on a light duty truck.
Figure 5:
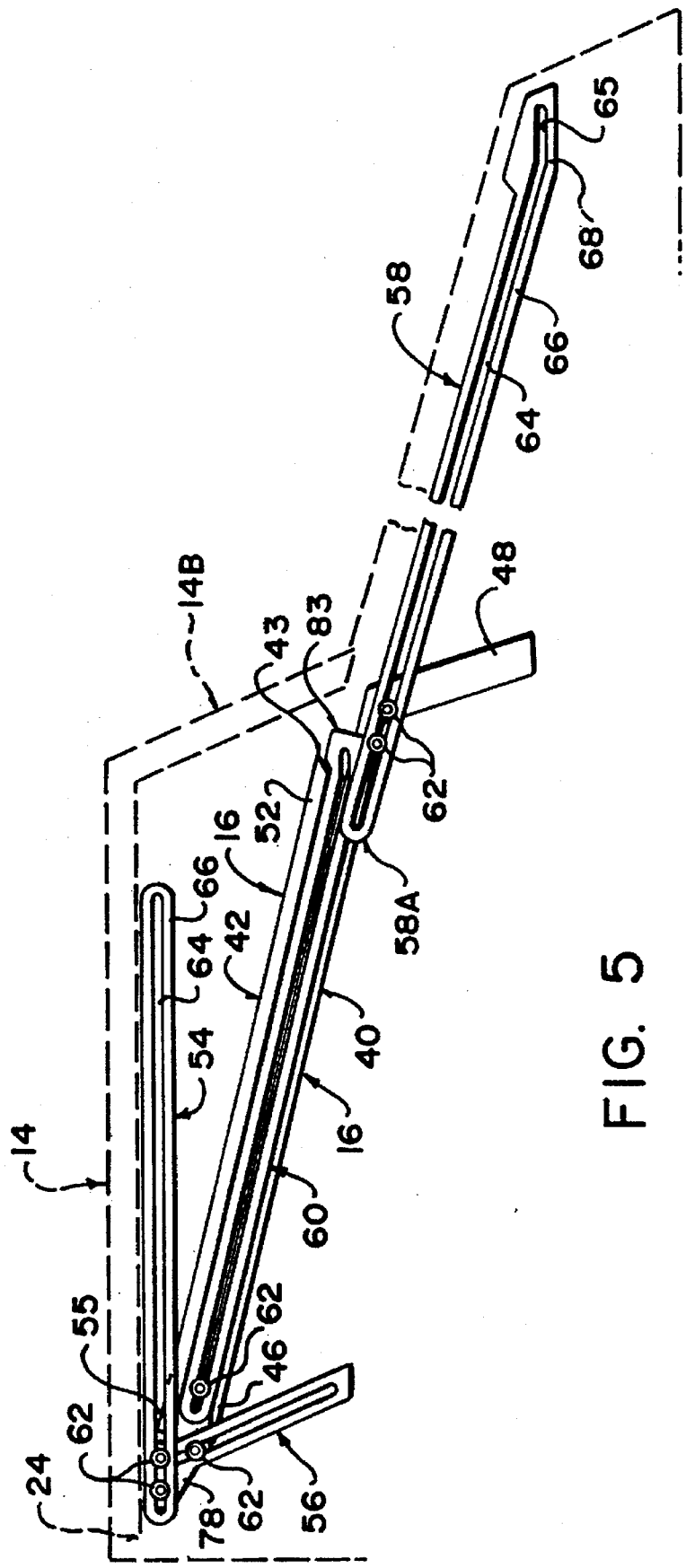
FIG. 5 is a side view of the tracks and cover members in the open position.
Figure 6:
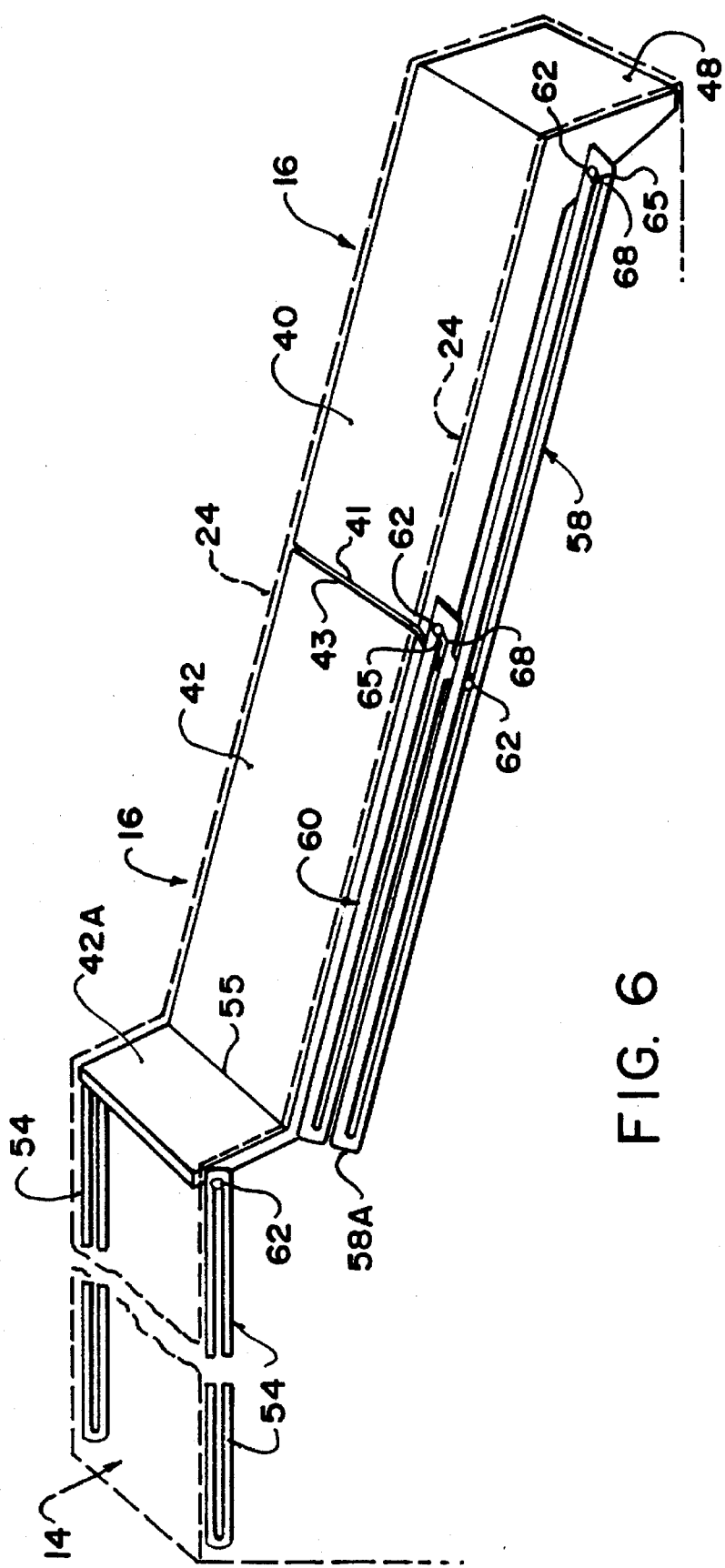
FIG. 6 is a side view of an alternative arrangement of the tracks and cover members in the closed position.

Referring to FIG. 1, 5, and 6 a preferred embodiment of a truck box cap is shown generally at 10. The truck box cap 10 comprises fixed side walls 12, an uppermost cover member 14, a plurality of telescoping cover members 16, and slidable connection means 18.

Figure 2:
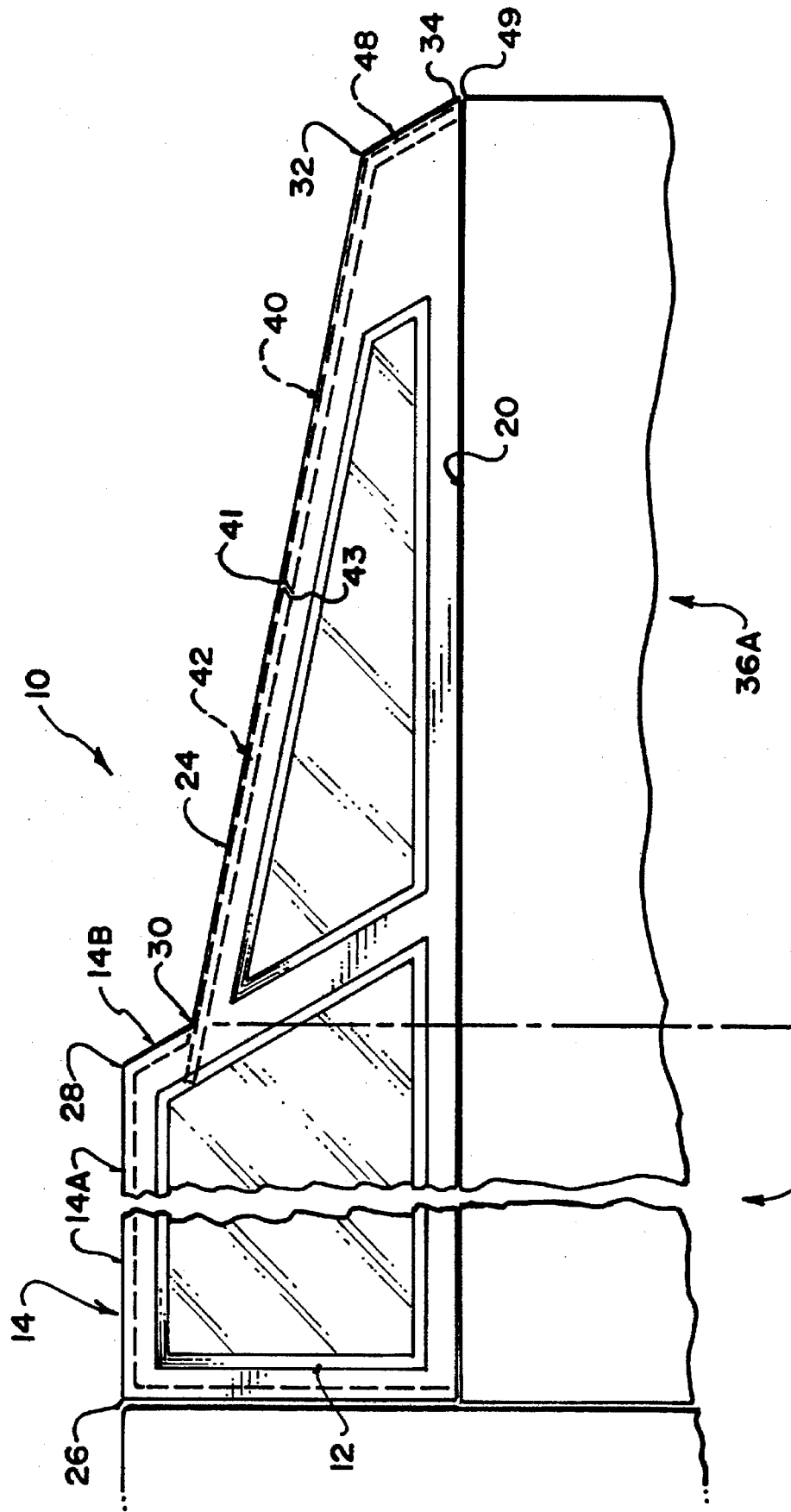
FIG. 2 is a side view of the truck box cap.

Referring to FIGS. 1 and 2 the side walls 12 of the truck box cap 10 are fixed along the upper edge 20 of the sides of the truck cargo box 22 and extend along the length of the box. The top edge 24 of each side wall 12 projects substantially horizontally from a front end 26 of the side walls 12 to a first point 28 spaced from the front end 26, then slopes steeply downwards from the first point 28 to a second point 30. The side walls 12 then slope more gradually downwards to a third point 32 and finally slope steeply downwards from the third point 32 to the rear end 34 of the wall.

Figure 3:
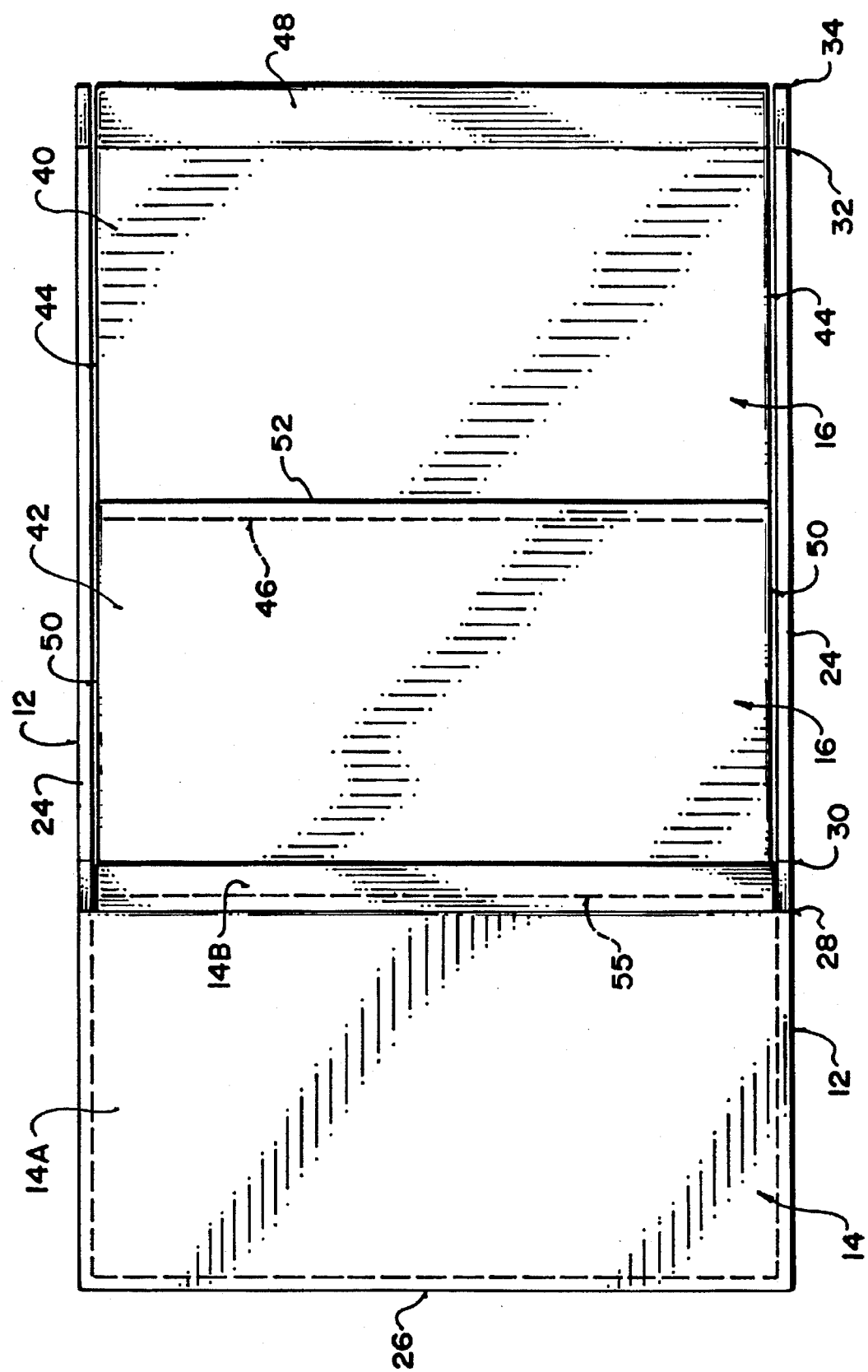
FIG. 3 is a top view of the truck box cap.

Referring to FIGS. 1, 2 and 3 the uppermost cover member 14 is arranged at the front end 26 of the side walls 12 and is fixed adjacent the top edges 24 of the side walls 12 extending therebetween thereby enclosing a first portion 36 of the cargo box 22. A substantially horizontal portion 14A of the uppermost cover member 14 extends from the front 26 of the side walls 12 to the first point 28 along each of the top edges 24 of the side walls 12. The uppermost cover member 14 also includes a sloped portion 14B arranged adjacent the rearward end of the uppermost cover member 14 and angles downwards from the first point 28 to the second point 30 parallel to the slope of the top edges 24 of side walls 12.

Figure 4:
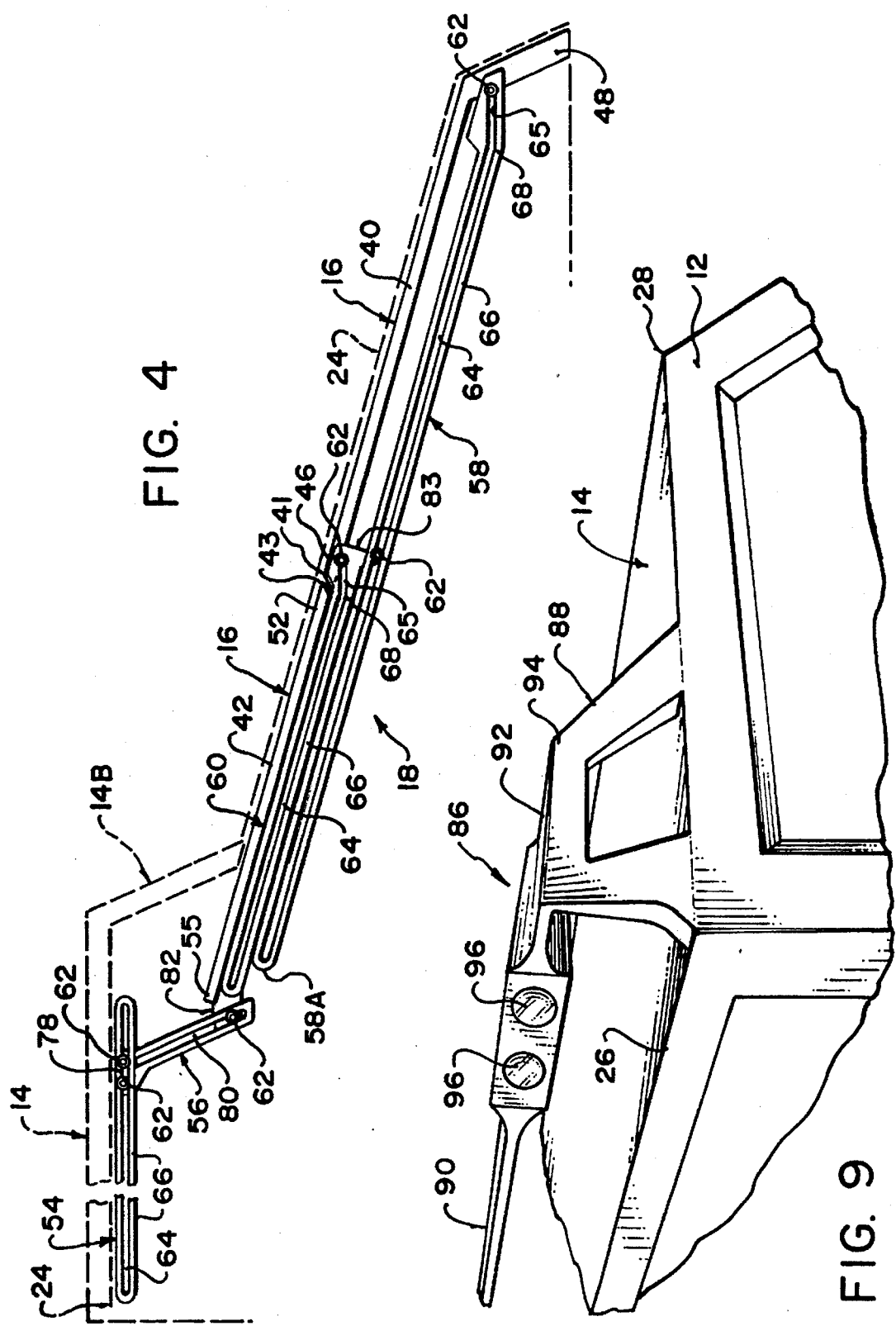
FIG. 4 is a side view of the tracks and cover members in the closed position.

Referring to FIGS. 3, 4 and 5 the plurality of telescoping cover members 16 are arranged rearwards of and below the uppermost cover member 14 and include a lowermost cover member 40 and an intermediate cover member 42.

The lowermost cover member 40 is arranged adjacent a rear end 34 of the side walls 12 for enclosing a rearward most part of the second portion 36A of said cargo box 22, and lies adjacent the top edges 24 of the side walls 12 and extends therebetween. The lowermost cover member 40 is attached to the slidable connection means 18 on each side 44 near each of its ends 46 and 48 and angles downwards following the slope of the top edge 24 of the side walls 12. The forward end 46 of the lowermost cover member 40 has an upwardly and rearwardly sloping face 41 arranged to cooperate with the intermediate cover member 42. The rearward end 48 of the lowermost cover member 40 angles down sharply to rest on a top 49 of the tail gate 51 of the cargo box 22, such that the tail gate 51 may be opened when the lowermost cover member 40 is in the closed position.

The intermediate cover member 42 is arranged between the uppermost cover member 14 and the lowermost cover member 40, and lies adjacent the top edges 24 of said side walls 12 extending therebetween thereby enclosing part of the second portion 36A of the cargo box 22. The intermediate cover member 42 is attached to the slidable connection means 18 along each of its sides 50 and angles downwards following the slope of the top edge 24 of the side walls 12. The rearward end 52 of the intermediate cover member 42 has a rearwardly and upwardly sloping face 43 arranged for cooperation with the sloping face 41 at the forward end 46 of the lower cover member 40. When in the closed position, the sloping face 43 of the rearward end 52 of the intermediate cover member 42 is immediately in contact with the sloping face 41 of the front end 46 of the lowermost cover member 40.

The slidable connection means 18 connect the telescoping cover members 16 such that the telescoping cover members 16 are extendible from a retracted position underneath the uppermost cover member 14 to a closed position covering the second portion 36A of said cargo box 22, and are retractable to the retracted position beneath said uppermost member 14 so as to leave the second portion 36A of said cargo box 22 partially or wholly open.

Referring to FIGS. 3, 4, and 5 the slidable connection means 18 comprise a pair of uppermost track members 54, a pair of hanger members 56, a pair of lowermost track members 58, a pair of intermediate track members 60, and movable attachment means or rollers 62.

Each track member comprises an elongate member having a slot 64 and a support surface 66 each extending longitudinally along its length. The slots 64 in the intermediate track members 60 and the slots 64 in the lowermost track members both are inclined downwardly and rearwardly and include a near horizontal portion 65 starting at a point 68 near their respective rearward ends. The horizontal portion causes the lowermost cover member 40, when moved to the closed position, to move horizontally thereby positioning the rearward end 48 to engage the top of the tailgate of the cargo box 22. This movement also causes the front sloping face 41 of the lowermost cover member 40 to move into immediate contact with the rear sloping face 43 of the intermediate cover member 42 as stated above.

The movable attachment means 62 comprise rotatably mounted wheel members or rollers each having an axle for projecting through the slot 64 in a respective track member and a wheel for engaging the supporting surface 66 of said slot 64 for movement therealong.

The pair of uppermost track members 54 are fixed one adjacent each of the respective side walls 12 adjacent the front ends 26 thereof and lie adjacent the underside of the uppermost cover member 14. The uppermost track members 54 lie parallel to the side walls 12 and support the upper end of the telescoping cover members 16.

The pair of lowermost track members 58 are fixed one adjacent each respective side wall 12 at a rear end 34 thereof. The lowermost track members 58 lie parallel to the side walls 12 to support and locate the lower end of each of the telescoping cover members 16. The lowermost track members 58 extend to an upper end 58A which is high enough to allow the intermediate cover member 42 and lowermost cover member 40 to move under the uppermost cover member 14.

The pair of hanger members 56 are substantially vertical and are attached by the rollers 62 at a top end 78, one hanger member 56 is attached to each uppermost track member 54 for movement therealong. Each hanger member 56 includes an upright slot 80 extending along its length.

The pair of intermediate track members 60 are arranged adjacent each respective side wall 12, and are fixed to an underside of said intermediate cover member 42. The intermediate track members 60 lie parallel to the side walls 12 and are attached by rollers 62 at a front end 82 to respective hanger members 56 for movement therealong, and by rollers 62 at a rear end 83 to the lower track members 58.

The lowermost cover member 40 is attached by rollers 62 adjacent a forward end 46 to the intermediate track members 60 for movement therealong, and is attached by movable attachment means 62 adjacent a rearward end 48 to the lowermost track members 58 for movement therealong.

The lowermost cover member 40 and the intermediate cover member 42 each may include a locking mechanism to provide for locking each cover in either the open or closed position.

Figure 7:
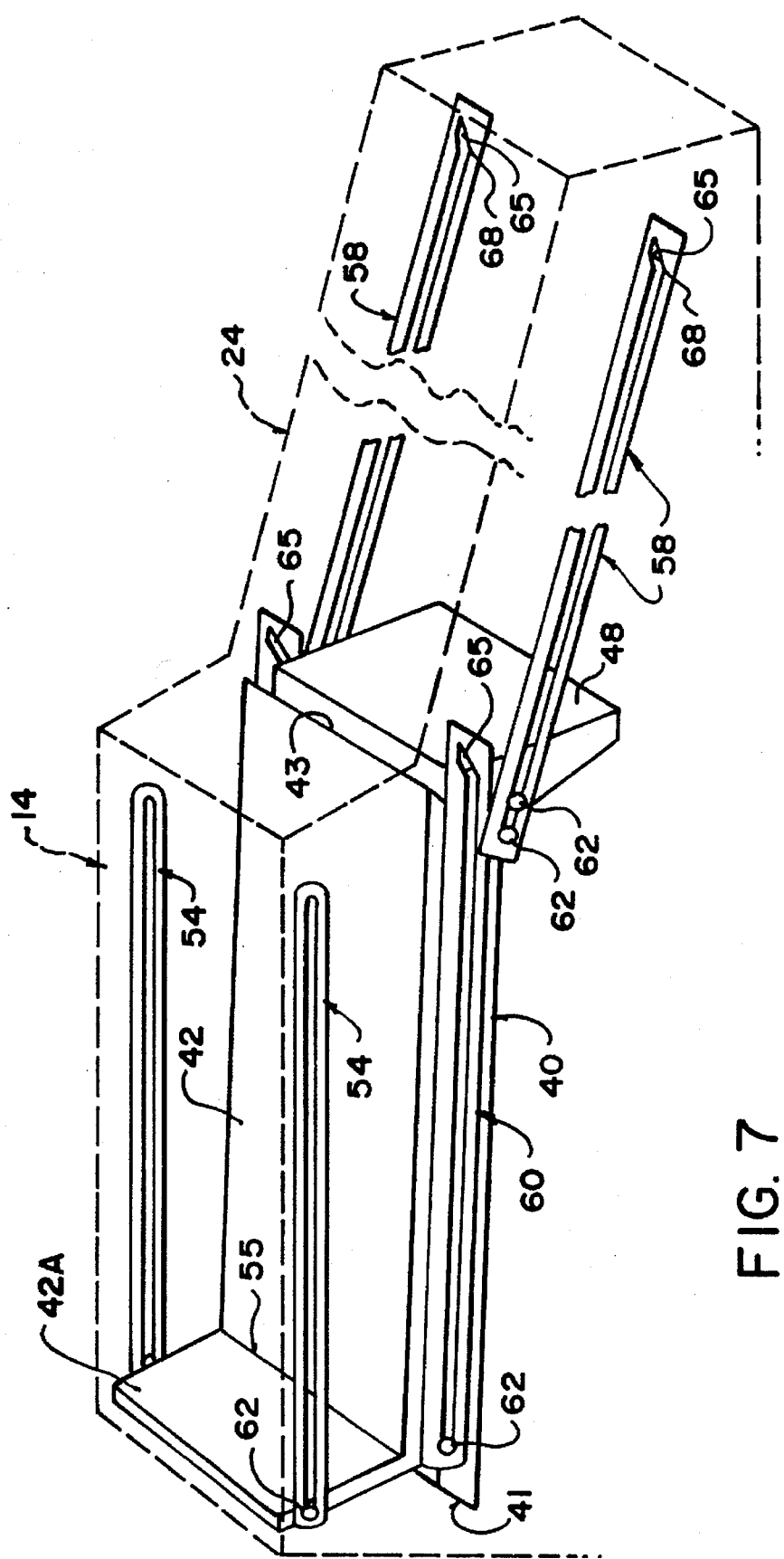
FIG. 7 is a side view of an alternative arrangement of the of the tracks and cover members in the open position.

In another embodiment of the invention the truck box cap 10 is substantially as described above except for the following differences. The upper most cover member 14 comprises only the horizontal portion 14A which extends from the front edge 26 to the first point 28. The sloped portion 14B of the uppermost cover member 14 is not present. To enclose the space formerly covered by the sloping portion 14B the intermediate cover portion 42 includes a upwardly and forwardly sloped portion 42A as can be seen in FIGS. 6 and 7 which extends upwardly and forwardly from the front edge 55 of the intermediate cover 42. The upwardly sloped portion 42A is sized and arranged to enclose the space between the uppermost cover member 14 and the intermediate cover member 42 when the intermediate cover member 42 is in the closed position. The intermediate track members 60 no longer are attached to the hanger members 56, but are connected directly to the uppermost track members 54 by rollers 62 mounted on the sides of the intermediate cover member 42 near the top end of the upwardly and forwardly sloping portion 42A. This simplifies the truck box cap since the hanger members 56 are no longer required.

Figure 8:
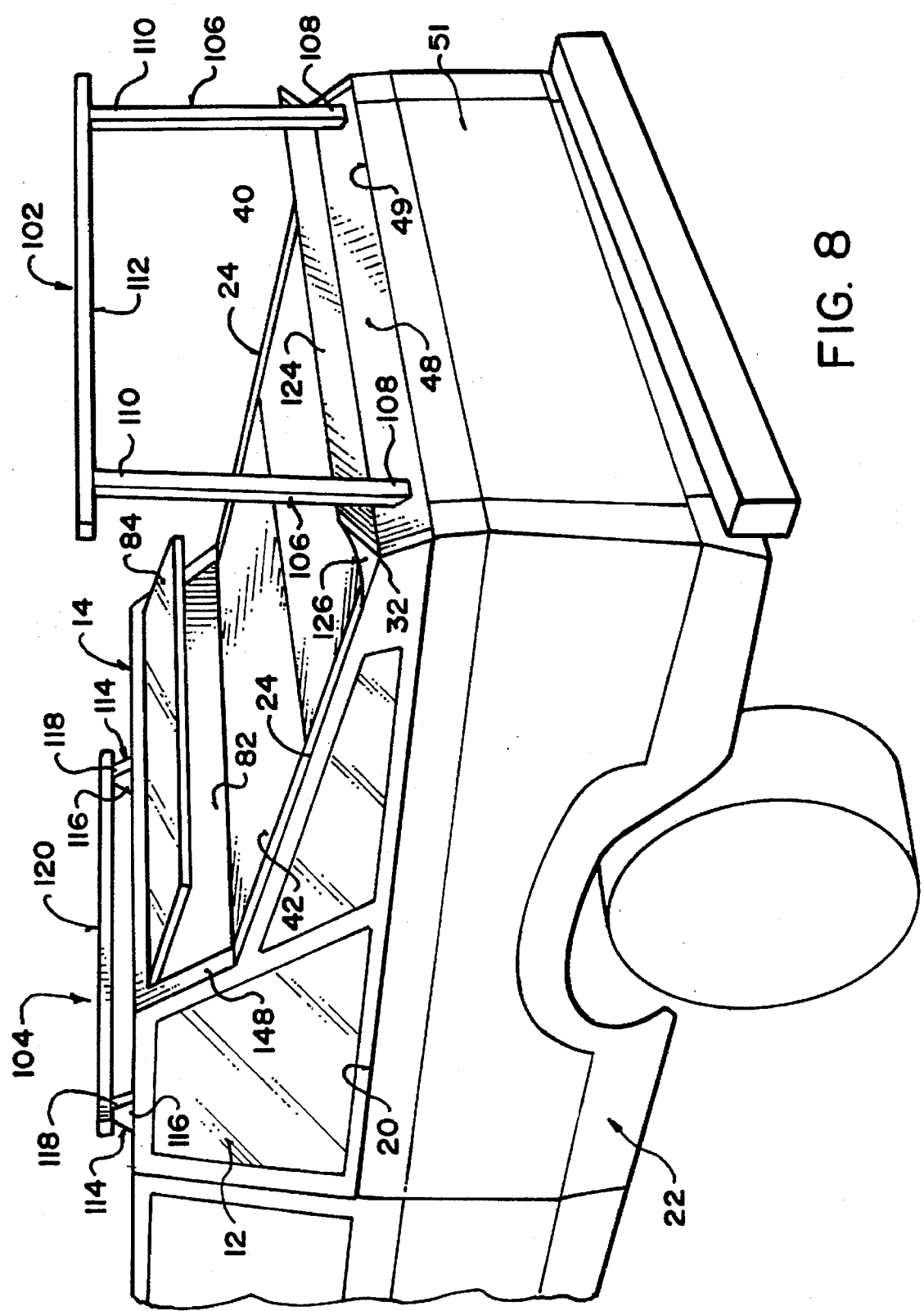
FIG. 8 is an isometric view showing an alternative arrangement of the truck box cap.

In another alternative embodiment, see FIG. 8, the sloped portion 14B of the upper most cover member 14, or the upwardly and forwardly sloped portion 42A of the intermediate cover member 42, may include a rain proof window comprising an opening 82 in the sloped portion 14B, or upwardly sloped portion 42A, and waterproof hinged window 84 over the opening 82. The hinged window 84 can be moved between a closed position lying substantially in the plane of the sloped portion 14B, or upwardly sloped portion 42A, to an open position out of said plane.

In another alternative embodiment, see FIGS. 8 and 9 the truck box cap 10 may include a roof wing and lamp arrangement 86 mounted adjacent the front 26 of the cap 10. The roof wing and lamp 86 comprises a pair of upright supports 88 one fixed adjacent each side 12 of the truck box cap 10. An elongate member 90 is fixed at each of its ends 92 to a top end 94 of the upright support 88. The roof wing and lamp 86 include a pair of lamps 96 spaced apart along the elongate member 90. The roof wing and lamp 86 enables the driver of the vehicle to project additional light from the vehicle, and improves the aesthetics of the truck box cap 10.

In another alternative embodiment the truck box cap 10 may include a removable roof rack comprising a first rack member 102 fixed to the lowermost cover member 40 adjacent a rear end 48 thereof. And a second roof rack member 104 fixed to the upper most cover member 14 adjacent the forward edge 26 thereof. The first roof rack member 102 comprises a pair of upright support members 106 extending upwards from a bottom end 108 removably and re-engagably fixed to the lower cover member 40 to a top end 110. The upper support members 106 are spaced apart laterally on the lower most cover member 40 and lie adjacent the side walls 12 of the cap 10. A substantially horizontal member 112 extends between the upright support members 106 and is fixed thereto. The second rack member 106 includes a pair of upright support members 114 removably and re-engagably fixed at a bottom end 116 to the uppermost cover member 14. The upright support members 114 extend upwards from the bottom end 116 to a top end 118 and are spaced apart laterally on the uppermost cover member 14 and lie adjacent the side walls 12 of the cap 10. A substantially horizontal member 120 extends between the upright support members 114 and is fixed to the top ends thereof. The substantially horizontal member 112 of the first rack member 104 and a substantially horizontal member 120 of the second rack member 106 are arranged to align substantially the same horizontal plane enabling the horizontal members to support an object in said plane.

In another alternative embodiment the truck box cap 10 may include a rear spoiler 124 arranged to extend laterally across the lower most cover member 40 adjacent the third point 32 on the side walls 12. The spoiler 124 comprises an upwardly curving or sloping member extending upwards and rearwards from the lower most cover member 40 and extending laterally along the lower most cover member 40 between the side walls 12. The side wall 12 may include an upwardly sloping or curving portion 126 matching the spoiler member 124 on the lower most cover member 40.

In a further alternative embodiment the truck box cap 10 may include a remotely actuated locking mechanism for locking the intermediate cover member 42 and lower most cover member 40 in place when in the closed position.

In a further alternative embodiment the intermediate track member 60 and the rear track member 64 both include a portion 65 angled upwards at a point 68 near the respective rearward ends such that the rear most cover member 40 moves upwards as it is fully extended to engage a top 49 of a rear tail gate 51 of the cargo box 22.

In a further alternative embodiment the truck box cap may include a plurality of intermediate cover members connected end to end.

While the present invention has been described in the foregoing, it is to be understood that other embodiments are possible within the scope of the invention. The invention is to be considered limited solely by the scope of the appended claims.

I claim:

1. A truck box cap for use with a light truck cargo box comprising:

side walls fixed along spaced apart parallel boundaries of said cargo box and extending along the length thereof;

an uppermost cover member being arranged at a front end of the side walls and fixed adjacent top edges of said side walls extending therebetween thereby enclosing a first portion of said cargo box;

a plurality of telescoping cover members including a rearmost cover member and an intermediate cover member arranged rearwards of the uppermost cover member and adjacent the top edges of said side walls extending therebetween thereby enclosing a second portion of said cargo box;

and slidable connection means connecting the plurality of telescoping cover members such that the plurality of telescoping cover members are extendible into a cover position extending from said uppermost cover member to substantially enclose the second portion of said cargo box, and are retractable into a retracted position beneath said uppermost member so as to leave the second portion of said cargo box at least partially open;

wherein the slidable connection means comprise:

two uppermost track members each fixed adjacent a respective side wall at a front end thereof and lying adjacent an underside of the uppermost cover member;

two rear track members each fixed adjacent a respective side wall;

two intermediate track members each being arranged adjacent a respective side wall, and fixed to an underside of said intermediate cover member;

and means attaching the intermediate track members to respective uppermost track members arranged at respective front ends of the intermediate track members and for movement along said uppermost track members;

and wherein the intermediate cover member is attached by movable attachment means adjacent a rearward end thereof to the rear track members for movement therealong, and wherein the rearmost cover member is attached by movable attachment means adjacent a forward end thereof to the intermediate track members for movement therealong, and is attached by movable attachment means adjacent a rearward end thereof to the rear track members for movement therealong.

2. A truck box cap in accordance with claim 1 wherein the means attaching the intermediate track members to respective uppermost track members comprise two hanger members each attached by movable attachment means at a top end to a respective one of the uppermost track members for movement therealong and depending downwardly therefrom, and movable attachment means mounted adjacent a forward end of each intermediate track member arranged for movement on the hanger members.

3. A truck box cap in accordance with claim 1 wherein the intermediate cover member includes a panel member arranged adjacent a forward end thereof and extending laterally across and upwardly therefrom, and wherein the means attaching the intermediate track members to respective uppermost track members comprise movable attachment means arranged on the panel member on opposite sides thereof to engage respective uppermost track members for movement therealong.

4. A truck box cap in accordance with claim 1 wherein the plurality of telescoping cover members are arranged end to end in the cover position.

5. A truck box cap in accordance with claim 1 wherein each one of the plurality of telescoping cover members consists of a substantially flat main body portion.

6. A truck box cap in accordance with claim 2 wherein each hanger member includes a vertical slot extending along its length.

7. A truck box cap in accordance with claim 1 wherein the uppermost track members are fixed to the underside of the uppermost cover member and are arranged to lie parallel to the side walls.

8. A truck box cap in accordance with claim 1 wherein the rear track members are fixed to a respective side wall, and are arranged to lie parallel to the side walls.

9. A truck box cap in accordance with claim 1 wherein the intermediate track member and the rear track member both include a portion angled horizontally starting at a point near their respective rearward ends such that the rearmost cover member moves horizontally as it is fully extended to engage a top of a rear tailgate of the cargo box.

10. A truck box cap in accordance with claim 1 wherein the rearmost cover member includes a portion thereof angled downwards at the rearward end to cooperate with the cargo box.

11. A truck box cap in accordance with claim 1 wherein the uppermost cover member lies in a substantially horizontal plane and angles downwards at a rear end.

12. A truck box cap for use with a light truck cargo box comprising:

side walls fixed along spaced apart parallel boundaries of said cargo box and extending along the length thereof;

a top edge of each side wall defining a first portion extending substantially horizontally from the front end to a first point spaced from the front end, a second portion which slopes steeply downwards from the first portion to a second point, and a third portion which slopes more gradually downwards from the second portion to a third point;

an uppermost cover member being arranged at the first portion of the side walls and fixed adjacent said top edges of said side walls extending therebetween thereby enclosing a first portion of said cargo box;

a plurality of telescoping cover members arranged rearwards of the uppermost cover member, adjacent the top edges of said side walls and extending between said third portions of said side walls so as to be inclined from the first portion rearwardly and downwardly therefrom thereby enclosing a second portion of said cargo box;

and slidable connection means mounting the plurality of telescoping cover members such that the plurality of telescoping cover members are extendible in a direction rearwardly and downwardly from said uppermost cover member to substantially enclose the second portion of said cargo box, and are retractable beneath said uppermost member so as to leave the second portion of said cargo box at least partially open.

13. A truck box cap in accordance with claim 12 wherein the slidable connection means comprise:

two uppermost track members each fixed adjacent a respective side wall at a front end thereof and lying adjacent an underside of the uppermost cover member;

two rear track members each fixed adjacent a respective side wall;

two intermediate track members each being arranged adjacent a respective side wall, and fixed to an underside of said intermediate cover member;

two hanger members each attached by movable attachment means at a top end to a respective one of the uppermost track members for movement therealong and depending downwardly therefrom and wherein the intermediate cover member is attached to each hanger member by movable attachment means arranged for movement on said hanger members and mounted adjacent a forward end of each intermediate track member, and is attached by movable attachment means adjacent a rearward end thereof to the rear track members for movement therealong, and wherein the rearmost cover member is attached by movable attachment means adjacent a forward end thereof to the intermediate track members for movement therealong, and is attached by movable attachment means adjacent a rearward end thereof to the rear track members for movement therealong.

14. A truck box cap in accordance with claim 12 wherein the slidable connection means comprise:

two uppermost track members each fixed adjacent a respective side wall at a front end thereof and lying adjacent an underside of the uppermost cover member;

two rear track members each fixed adjacent a respective side wall;

two intermediate track members each being arranged adjacent a respective side wall, and fixed to an underside of said intermediate cover member;

and wherein the intermediate cover member includes an panel member arranged adjacent a forward end thereof and extending laterally across and upwardly therefrom, and is attached to each upper track member by movable attachment means arranged on the panel member on opposite sides thereof to engage respective uppermost track members for movement therealong, and is attached by movable attachment means adjacent a rearward end thereof to the rear track members for movement therealong, and wherein the rearmost cover member is attached by movable attachment means adjacent a forward end thereof to the intermediate track members for movement therealong, and is attached by movable attachment means adjacent a rearward end thereof to the rear track members for movement therealong.

15. A truck box cap in accordance with claim 12 wherein the plurality of telescoping cover members are arranged end to end in the cover position.

16. A truck box cap in accordance with claim 12 wherein the intermediate track member and the rear track member both include a portion angled horizontally starting at a point near their respective rearward ends such that the rearmost cover member moves horizontally as it is fully extended to engage a top of a rear tailgate of the cargo box.

17. A truck box cap for use with a light truck cargo box comprising:

side walls fixed along spaced apart parallel boundaries of said cargo box and extending along the length thereof;

an uppermost cover member being arranged at a front end of the side walls and fixed adjacent top edges of said side walls extending therebetween thereby enclosing a first portion of said cargo box;

a plurality of telescoping cover members including a rearmost cover member and an intermediate cover member arranged rearwards of the uppermost cover member and adjacent the top edges of said side walls extending therebetween thereby enclosing a second portion of said cargo box;

the cover members being inclined downwardly and rearwardly from the uppermost cover member;

and slidable connection means mounting the plurality of telescoping cover members for sliding movement in a direction inclined downwardly and rearwardly from the uppermost cover member such that the plurality of telescoping cover members are extendible into a covering position extending from said uppermost cover member to substantially enclose the second portion of said cargo box, and are retractable into a retracted position beneath said uppermost member so as to leave the second portion of said cargo box at least partially open;

wherein each one of the lowermost and intermediate cover members includes a substantially flat main body portion;

and wherein the slidable connection means includes guide elements for the lowermost cover member which are angled from the direction inclined rearwardly and downwardly in a substantially horizontal direction starting at a point near their respective rearward ends such that the lowermost cover member moves substantially horizontally as it is fully extended to move to a position in which a forward edge thereof lies substantially immediately underneath a rearward edge of the intermediate cover member.

18. A truck box cap in accordance with claim 17 wherein the slidable connection means comprise:

two uppermost track members each fixed adjacent a respective side wall at a front end thereof and lying adjacent an underside of the uppermost cover member;

two rear track members each fixed adjacent a respective side wall;

two intermediate track members each being arranged adjacent a respective side wall, and fixed to an underside of said intermediate cover member;

two hanger members each attached by movable attachment means at a top end to a respective one of the uppermost track members for movement therealong and depending downwardly therefrom and wherein the intermediate cover member is attached to each hanger member by movable attachment means arranged for movement on said hanger members and mounted adjacent a forward end of each intermediate track member, and is attached by movable attachment means adjacent a rearward end thereof to the rear track members for movement therealong, and wherein the rearmost cover member is attached by movable attachment means adjacent a forward end thereof to the intermediate track members for movement therealong, and is attached by movable attachment means adjacent a rearward end thereof to the rear track members for movement therealong.

19. A truck box cap in accordance with claim 17 wherein the slidable connection means comprise:

two uppermost track members each fixed adjacent a respective side wall at a front end thereof and lying adjacent an underside of the uppermost cover member;

two rear track members each fixed adjacent a respective side wall;

two intermediate track members each being arranged adjacent a respective side wall, and fixed to an underside of said intermediate cover member;

and wherein the intermediate cover member includes an panel member arranged adjacent a forward end thereof and extending laterally across and upwardly therefrom, and is attached to each upper track member by movable attachment means arranged on the panel member on opposite sides thereof to engage respective uppermost track members for movement therealong, and is attached by movable attachment means adjacent a rearward end thereof to the rear track members for movement therealong, and wherein the rearmost cover member is attached by movable attachment means adjacent a forward end thereof to the intermediate track members for movement therealong, and is attached by movable attachment means adjacent a rearward end thereof to the rear track members for movement therealong.

20. A truck box cap in accordance with claim 17 wherein the plurality of telescoping cover members are arranged end to end in the cover position.

* * * * *